Feb. 7, 1933.  H. J. GEBHARDT  1,896,774
HEAT EXCHANGE APPARATUS
Filed March 17, 1930   3 Sheets-Sheet 1
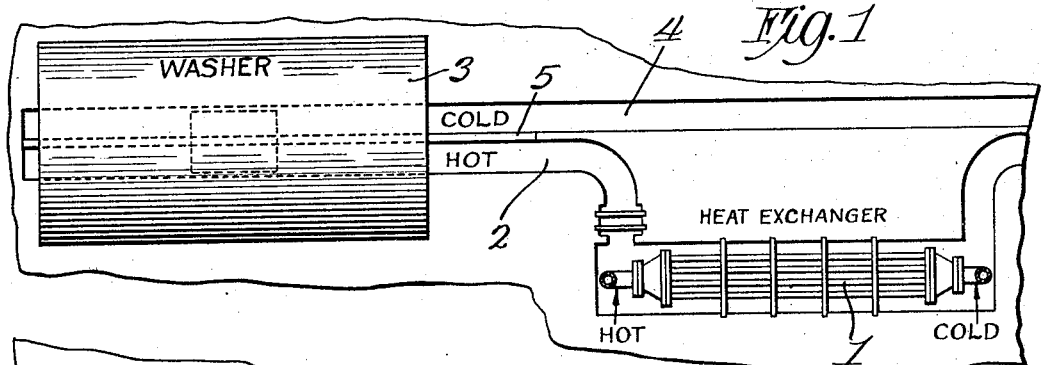
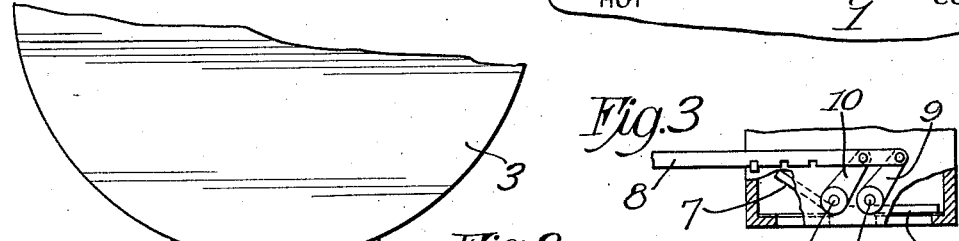
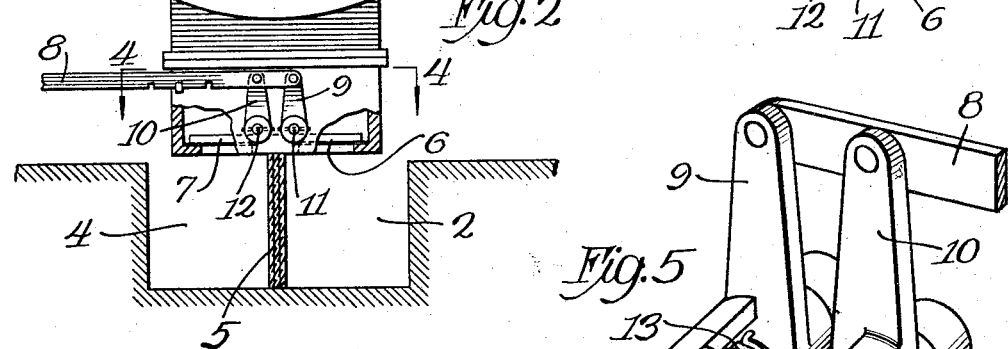
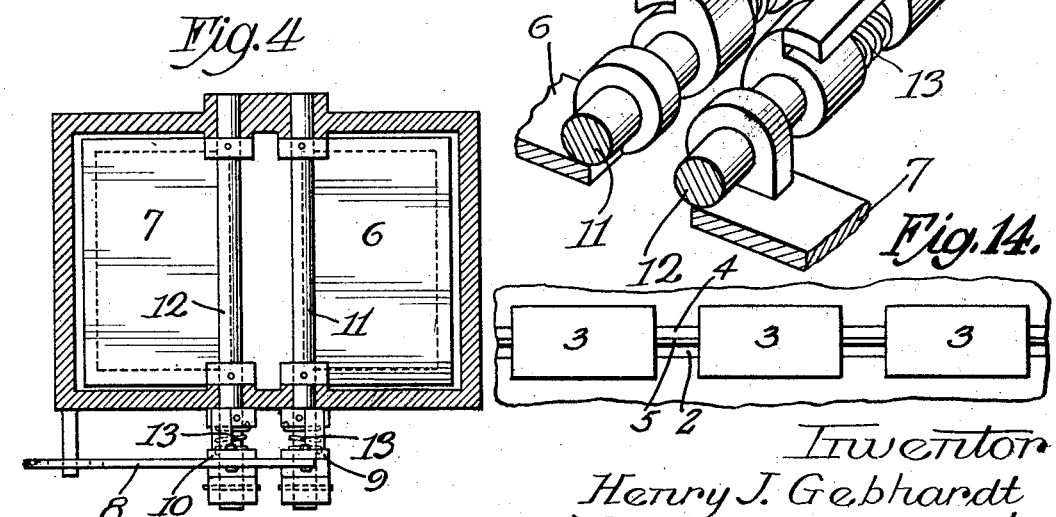
Inventor
Henry J. Gebhardt
By Arthur F. Durand
Attys.

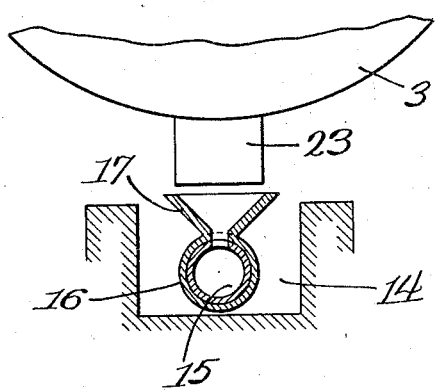
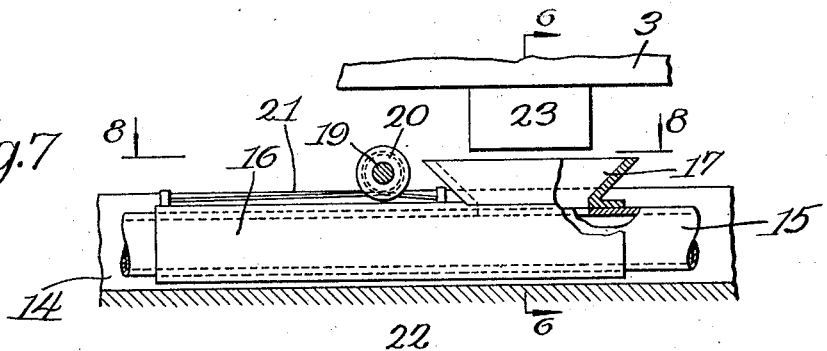
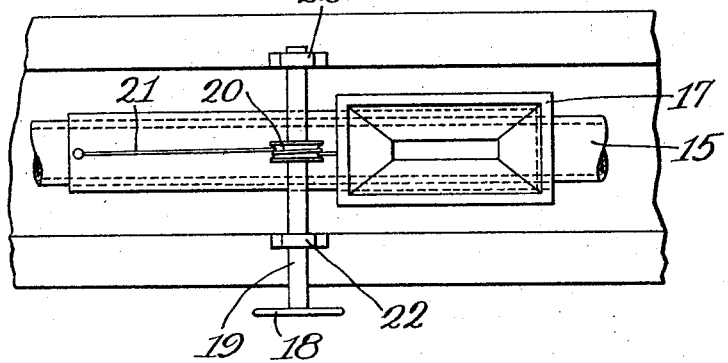
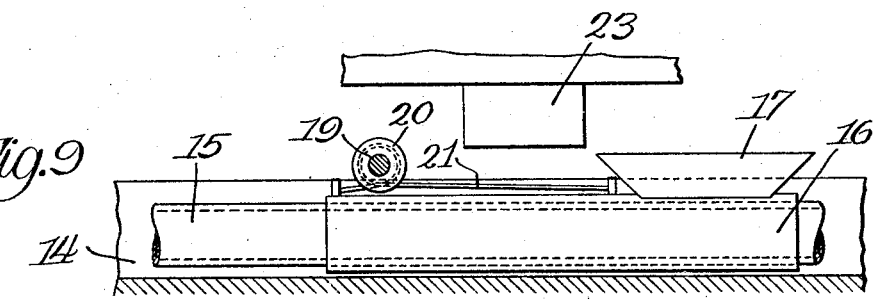

Feb. 7, 1933. H. J. GEBHARDT 1,896,774
HEAT EXCHANGE APPARATUS
Filed March 17, 1930  3 Sheets-Sheet 3

Inventor
Henry J. Gebhardt
By Arthur F. Durand
Atty.

Patented Feb. 7, 1933

1,896,774

UNITED STATES PATENT OFFICE

HENRY J. GEBHARDT, OF CHICAGO, ILLINOIS

HEAT EXCHANGE APPARATUS

Application filed March 17, 1930. Serial No. 436,277.

This invention relates to heat exchange apparatus, and more particularly to apparatus of this kind employed in laundries and other places where used hot water is ordinarily discharged into the sewers or thrown away in some other manner, and is not used for any further or useful purpose.

Generally stated, therefore, the object of the invention is to provide a novel and improved construction and arrangement whereby the used hot water, say, from the laundry washer, is kept separate from the used cold water, whereby the said used hot water may be kept separate from the used cold water, and whereby the used hot wash-water, or other heated water, will not be chilled by mixing it with cold water, so that the full temperature of the hot water may be used for preheating fresh water coming into the laundry, or other place, before such fresh water is permitted to enter the heater by which it is then raised to the temperature necessary for washing or other purposes.

It is also an object to provide certain details and features of construction and combinations tending to increase the general efficiency and the desirability of an apparatus of this particular character.

To the foregoing and other useful ends, the invention consists in matters hereinafter set forth and claimed, and shown in the accompanying drawings, in which—

Fig. 1 is a side elevation of a heat exchange apparatus with a hot and cold water segregator connected thereto, embodying the principles of the invention;

Fig. 2 is an enlarged vertical section of a portion of said apparatus;

Fig. 3 is a fragmentary view similar to Fig. 2, showing the valves in a different position;

Fig. 4 is an enlarged horizontal section on line 4—4 in Fig. 2 of the drawings;

Fig. 5 is a perspective of some of the parts shown in Figs. 2, 3 and 4 of the drawings;

Figure 10:
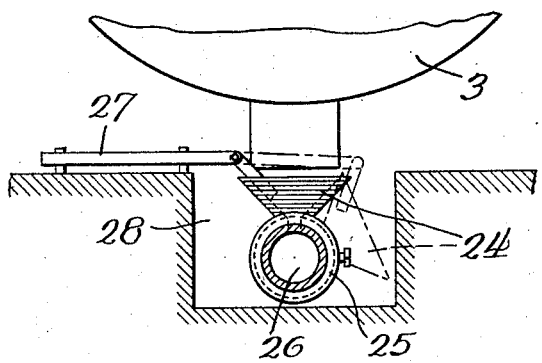
Figure 11:
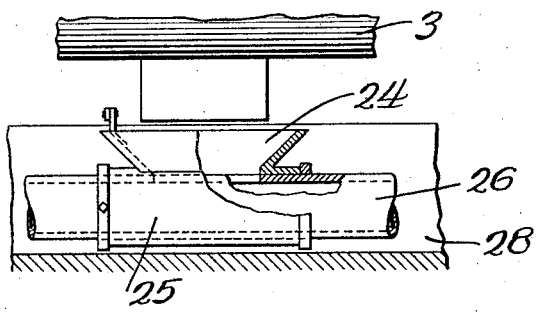
Figure 12:
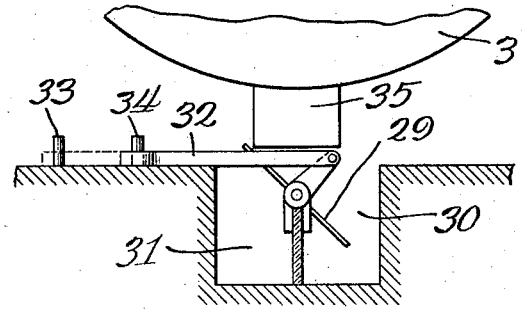
Figure 13:
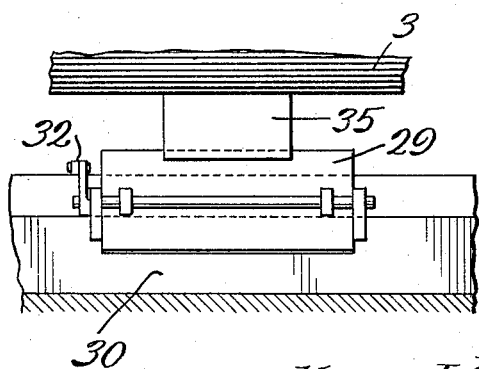

Figs. 6, 7, 8 and 9 are detail views showing a different form of the invention, Fig. 8 being, in effect, a horizontal section on line 8—8 in Fig. 7, while Fig. 6 is, in effect, a vertical transverse section on line 6—6 in Fig. 7 of the drawings;

Figs. 10 and 11 are detail views showing a different form of the invention, Fig. 10 being in the nature of a vertical transverse section, and Fig. 11 being a side elevation;

Figs. 12 and 13 are detail views showing a different form of the invention, Fig. 12 being in the nature of a vertical transverse section, and Fig. 13 being a side elevation.

Fig. 14 is a diagrammatic view showing a plurality of washers arranged along the length of a common trench into which the washers are adapted to discharge their contents, without interfering with each other.

As thus illustrated, and referring to Figs. 1 to 5 of the drawings, the invention comprises a heat exchange element 1 of any suitable or desired character, having a hot water connection 2 with the washer 3 of a laundry, which washer may be of any suitable, known or approved character. The heating element 1 is for heating the fresh water entering the laundry, for wash-water purposes, or for any other purpose, and the hot used wash-water from the washer circulates outside of the element 1, whereby the fresh water in the latter is heated. The cold water from the washer, or from the washing apparatus, is discharged therefrom through a pipe or conduit 4, and all of the used water thus discharged from the washer may be discharged into a sewer, or other place, but before the hot used wash-water is thus thrown away, it is used to heat the fresh water entering the laundry, or other place.

As shown in Figs. 1 to 5, inclusive, the washer 3 has a valve mechanism for controlling the discharge of water therefrom, so that if the water is hot, it may be discharged through the pipe or conduit 2, whereas if the water is cold or of too low a temperature, it may be discharged through the conduit 4, previously mentioned, as follows. The elements 2 and 4 may be channels in the cement or concrete of the structure, for example, as shown in Fig. 2 of the drawings, there being a partition 5 between them. A valve 6 controls the discharge into the conduit 2, while a similar valve 7 controls the discharge into the conduit 4, and said valves are operated by a bar 8, pivoted on the arms 9 and 10, which arms are, respectively, loosely mounted on the pivots 11 and 12 of the valves, as shown. These arms 9 and 10 have spring connections 13 with the pivots or shafts 11 and 12, as shown in Fig. 5 of the drawings, whereby reciprocation of the rod or bar 8 in one direction will open one valve, while movement of the bar or rod in the opposite direction will open the other valve, as illustrated in Fig. 3 of the drawings, in which the valve 7 is open and the valve 6 is closed, whereby the discharge from the washer is easily controlled, and the flowing of cold water to the heat exchange element 1 is avoided.

In Figs. 6, 7, 8 and 9, the hot water conduit 14 encloses the cold water conduit 15, which latter is in the nature of a pipe or tube having a sliding sleeve 16 with a hopper 17 thereon. A hand-wheel 18 on the shaft 19 is connected by a sheave 20 and a rope or flexible connection 21 with the said hopper, so that the latter and the sleeve 16 may be moved longitudinally of the pipe or tube 15, the shaft 19 being mounted in bearings 22 on the stationary structure. Thus, when the hopper 17 is in the position shown in Figs. 7 and 8, it will discharge into the tube or conduit 15, and thus dispose of the cold water from the washer. When the hopper is in the position shown in Fig. 9, the washer spout 23 will discharge onto the sleeve 16 and thus spill the hot water into the conduit 14, from which latter the used hot wash-water will then flow around the heating unit 1, shown in Fig. 1 of the drawings.

In Figs. 10 and 11 of the drawings, the construction is similar to that shown in Figs. 6 to 9, inclusive, but in this case, the hopper 24 and its sleeve 25 are rotatable on the cold water conduit 26, and are operated by a rod or bar 27 in the position shown in dotted lines in Fig. 10, when it is desired to spill the discharge from the washer into the outside conduit 28 in which the cold water conduit is located. When the hopper 24 is in the position shown in full lines in Figs. 10 and 11, the cold water will be discharged into the conduit 26; but when the hopper and sleeve are tilted in the position shown in dotted lines, then the hot water from the washer will be discharged on the outside of the sleeve 25, and from the latter into the conduit 28, as stated.

In Figs. 12 and 13, the construction is somewhat similar to that shown in Figs. 1 to 5 of the drawings, but in this case a single valve 29 is provided to control the discharge into the hot and cold water conduits 30 and 31, in a manner that will be readily understood. The valve 29 is operable by means of a bar or rod 32, which latter can be hooked onto either one of two pins 33 or 34, to hold the valve 29 tilted in either direction, whereby the discharge from the washer spout 35 may be directed into either conduit 30 or 31 at will, depending upon whether the discharge from the washer is hot or cold.

It will be seen, therefore, that with each form of the invention, the hot used wash-water from the washer is not mixed with any cold water discharged therefrom, but is kept separate, so that the hot used wash-water will not be chilled and will be fully effective in heating the water in the heating element 1, shown in Fig. 1 of the drawings.

While the invention is shown as applied to a laundry apparatus, for the purpose of extracting heat from the hot used wash-water, in order to preheat incoming fresh water, it will be understood that the invention is not limited to the problem of heating water for use in laundries, but may be used in other places and for other purposes.

Thus, in each form of the invention, as shown and described, valve means or valve mechanism are employed for controlling the discharge of used water from the washer, or from any other apparatus, so that any cold used water may be diverted away from the heat exchange apparatus. In other words, the washer or similar apparatus has a single discharge spout or opening for all of the water, both hot and cold, but this does not interfere with the efficiency of the heat exchange apparatus, whereby incoming fresh water is heated by outgoing used hot wash-water, inasmuch as any cold water or water of relatively low temperature, discharged from the same spout or opening of the washer, is diverted into another channel and thus prevented from reaching the heat exchange apparatus by which the incoming fresh water is heated.

It will be understood, of course, that it is common to use a series of the washers shown, arranged in a row, over the same pipe or trench underneath, and that while one washer is discharging cold water, the washer next to it can be discharging hot water, and the two kinds of water, with the arrangement shown and described, can be separated as explained.

It will be seen that the cold water in the passage 4, or in the passage 15, is diverted from the heat exchange means without in any way interfering with the free flow of any heated water in the passage 2 or in the passage 14 to the heat exchange means. If there is heated water flowing freely to the heat exchange means, the discharge of cold water from any washer does not cut off or interrupt such flow of heated water to the heat exchange means; and, vice versa, the discharge of any heated water from the washer does not interrupt or restrict the free flow of any cold water in the passage for the latter, away from the heat exchange means. The valve means for the bottom of any washer, of course, is normally entirely closed, but this does not interrupt the free flow of both heated and cold water in their respective passages, along the trench, for the purpose of conducting the heated water to the heat exchange means, and for the purpose of diverting the cold water around or from the heat exchange means. One passage formed in the open trench is deflected away from the other passage and is enlarged at 36 to provide an immersion tank for the heating element 1 of the heat exchange means, so that this element may be immersed more or less in the heated water, which latter is the outgoing waste water from the washer or washers. In this way, the trench and the heat exchange means are readily accessible from the top thereof, for the purpose of cleaning or repair. It is obvious that any number of washers, depending upon the size or capacity of the laundry, can be arranged along the length of the open trench, to discharge their contents into the trench, as shown in diagram in Fig. 14 of the drawings. In this way, a more or less steady flow of heated water can be insured for the heat exchange means, without any interruption by the diversion of the cold water. In other words, any flow of heated water is never shut off, even momentarily, to accomplish the diversion of the cold water. This is true when only one washer is used, and with a plurality of washers, it is obvious that the supply of heated water will be less intermittent and more constant, inasmuch as the different washers may be discharged at different times, thus keeping up a more or less continuous flow of heated water to the heat exchange means.

What I claim as my invention is:

1. In combination with heat exchange apparatus to receive heated waste water for heating other water, through the medium of a heating element, instrumentalities for supplying the heated water and having provisions for separating any cold water discharged therefrom and for preventing such cold water from entering the heat exchange apparatus, operative to divert the cold water without restricting the heated water passage to said apparatus.

2. A structure as specified in claim 1, said provisions comprising normally closed valve means and separate conduits for the heated water and the cold water, said valve means being operative to cause the discharge from said instrumentalities to enter either the heated water conduit or the cold water conduit, the heated water conduit leading to said heat exchange apparatus.

3. A structure as specified in claim 1, said instrumentalities comprising a laundry washer adapted to discharge either heated washwater or cold water therefrom, and said provisions comprising normally closed valve means operative to control said discharge, thereby to prevent the cold water from reaching the heat exchange apparatus.

4. A structure as specified in claim 1, said instrumentalities comprising apparatus adapted to use either heated or cold water and said provisions comprising normally closed valve means for controlling the discharge from said instrumentalities and for thereby preventing cold water from reaching said heat exchange apparatus.

5. In combination with heat exchange apparatus, whereby used heated water is employed for heating incoming fresh water, the combination of a plurality of laundry washers arranged in a row, with a common conduit means below for receiving the discharge of both heated and cold water from said washers, providing separate passages below the washers for the heated and cold water, having means individual to each washer for discharging selectively into said passages, whereby only the heated water is permitted to reach the heat exchange apparatus, while the cold water is prevented from reaching said apparatus, without restricting the free flow in the heated water passage to said apparatus.

6. Apparatus for heating fresh incoming water by absorption of heat from outgoing waste heated water, comprising an open trench over which one or more laundry washers can be arranged to discharge the used wash water into the trench, diversion means in the trench to separate discharged cold water from discharged heated water, and a heat exchange means comprising a fresh water heater disposed in the path of the heated water, whereby the cold water is diverted from said element without interfering with the free flow of any heated water in said trench to said heat exchange means.

7. A structure as specified in claim 6, said diversion means including means forming separate parallel passages in said trench, separating the cold water from the heated water and including valve means for discharging the contents of the washer into either one of said passages at will, preventing any cutting off of the free flow in either passage.

8. A structure as specified in claim 6, said diversion means including means to form separate parallel passages in said trench, and each washer, when a plurality of washers is employed, being manually controllable to discharge its contents into either one of said passages at will, thereby preventing the diversion of cold water in one passage from shutting off the free flow of heated water in the other passage to said heat exchange means.

9. A structure as specified in claim 6, said diversion means comprising means forming parallel passages in said trench, one for cold water and the other for the heated water, and comprising valve means for controlling the discharge from the washer into either one of said passages at will, and a single handle by which said valve means is manually operable at will, said valve means being operable to selectively control the discharge into said trench without restricting either of said passages, whereby the cold water is diverted without interrupting or restricting the free flow of any heated water in said trench to said heat exchange means.

10. A structure as specified in claim 6, said diversion means comprising means to form parallel passages in said trench, one for the cold water and one for the heated water, the heated water passage being deflected laterally away from the other passage and enlarged to form an immersion tank for said heating element.

Specification signed this 13th day of March, 1930.

H. J. GEBHARDT.